Figure 1:
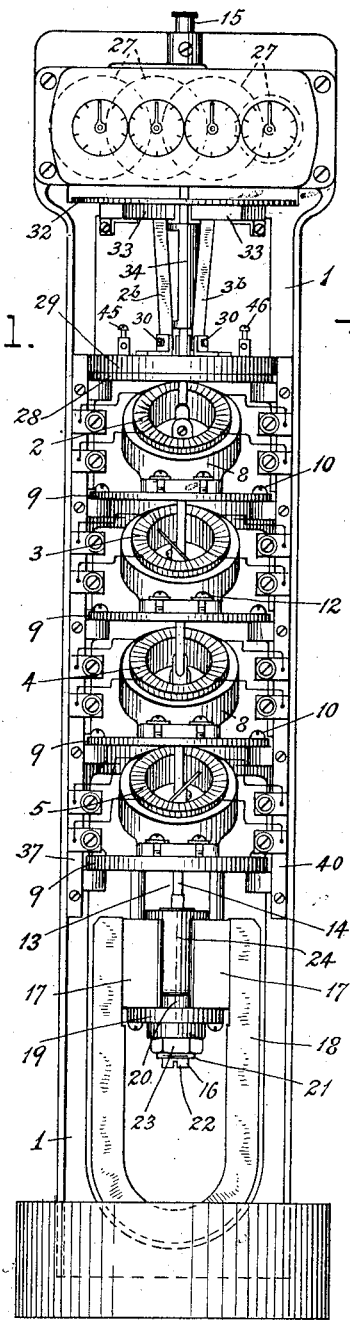

T. W. VARLEY.
ELECTRIC METER.
APPLICATION FILED DEC. 12, 1918.

1,352,564.

Patented Sept. 14, 1920.
2 SHEETS—SHEET 1.

WITNESSES

INVENTOR
THOMAS W. VARLEY
BY
ATTORNEYS

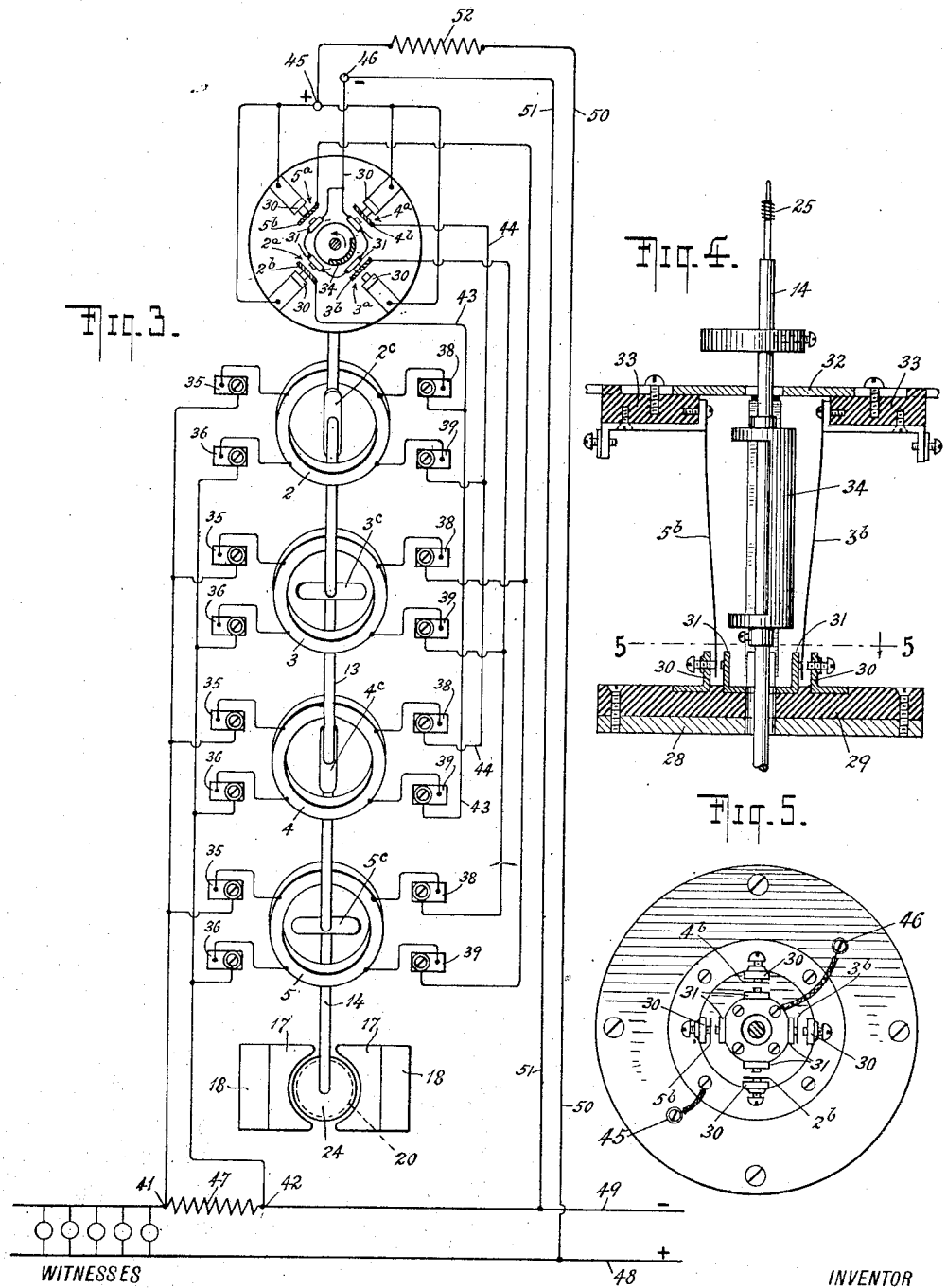

UNITED STATES PATENT OFFICE.

THOMAS W. VARLEY, OF NEW YORK, N. Y.

ELECTRIC METER.

1,352,564.  Specification of Letters Patent.  Patented Sept. 14, 1920.

Application filed December 12, 1918. Serial No. 266,436.

*To all whom it may concern:*

Be it known that I, THOMAS W. VARLEY, a citizen of the United States, residing in the city, county, and State of New York, have invented certain new and useful Improvements in Electric Meters, of which the following is a specification.

My invention relates to electric meters and is more particularly concerned with what are known as direct current watt-hour meters, or meters for the measurement of the energy consumed by lamps, motors or other devices supplied by direct current whether of constant or variable E. M. F.

It is an object of my invention to provide an improved meter of the class referred to which shall have but few parts and they but simple and inexpensive.

A further object of the invention is to provide a meter of the class referred to in which there shall be no rotating coils and in which the rotating element proper shall be soft iron of small size and weight and of simple design. The rotating element is thus little liable to derangement, it will be subject to exceedingly small frictional losses, and its inertia will also be very small.

Still another object of my invention is to provide a meter of the class described in which the soft iron parts shall be substantially free from hysteresis errors.

Yet another object of my invention is to provide a meter of the class described which shall give indications directly proportional to the product of E. M. F. and current without correction of any kind.

My invention includes a special form of frictionless quick break commutating switch for reversing the current through the E. M. F. coils.

Other objects of the invention will appear as the specification proceeds.

My invention may be briefly described as comprising one or more very light and small soft iron elements fixed upon a rotatable shaft, each element being so related to two pairs of fixed coils that oppositely acting torques are simultaneously imposed upon the element. Each pair of fixed coils is identical with the other pair and comprises a load coil (carrying current proportional to the load to be measured and an E. M. F. coil carrying current proportional to the E. M. F. of the load current). The several coils are so connected up that the magnetic-flux produced by the two load coils has the same sign while that of the two E. M. F. coils is of opposite sign. Hence if $a$ represents the ampere turns (proportional to the magnetic-flux) for each load coil, and $b$ the ampere turns of each E. M. F. coil, then since the torque is proportional to the magnetic-flux squared, the net resultant torque tending to turn the rotating member may be expressed as $$K[(a+b)^2-(a-b)^2]=4Kab$$

where $K$ is a constant.

By periodically reversing the E. M. F. coils at appropriate times, continuous motion of the rotatable soft iron member will be produced and the speed of such motion at any instant will, of course, be proportional to the torque as above set out, it being understood, of course, that the usual magnetic brake or equivalent thereof, supplying a load proportional to the speed, is arranged to act upon the rotating system. The total of the revolutions in a given time, readily determinable by gearing the rotatable member to a suitable integrating mechanism, will be a measure of the total watts or energy developed during such time.

Figure 2:
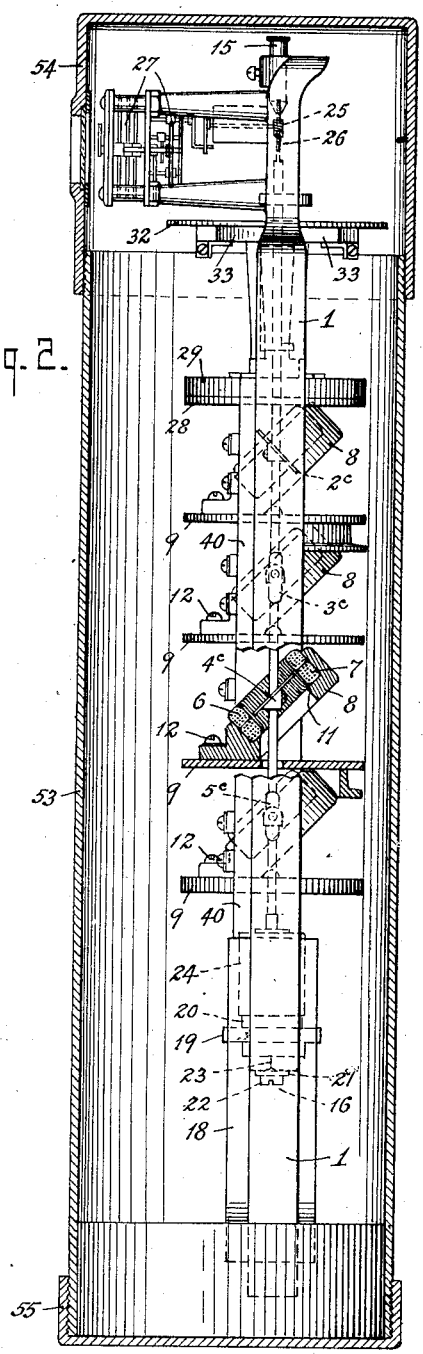

My invention will be better understood by referring to the accompanying drawings in which Figure 1 represents a front elevation of a preferred embodiment thereof, the casing of the meter being removed; Fig. 2 represents a view, part section, taken from the right of Fig. 1, the casing being shown; Fig. 3 is a diagrammatic view showing the relation of the operative parts and the wiring system; Fig. 4 is an enlarged axial section, part elevation, of the magnetic commutating switch; and Fig. 5 is a cross-section taken along the line 5—5 of Fig. 4.

In the drawings, a skeleton frame, 1, of cast aluminum or other suitable material, supports four pairs or sets of coils 2, 3, 4, 5. These coils are disposed in line one above the other in parallel planes, and are all set at an angle of 45° with the front of the meter.

Each pair or set of coils is identical with every other set, and comprises a load coil, 6, and an E. M. F. or voltage coil, 7. The two coils are given the shape of short tubes and are cemented together and in shallow aluminum cups, 8, fastened to supporting disks, 9, by screws, 12. The center portions of these cups are cut away so as to leave a narrow supporting flange, 11, against which the set of coils abuts. Disks, 9, are themselves attached to frame, 1, by screws, 10.

The windings of the load and voltage coils are suitably determined according to the magnitude of the maximum load, of the E. M. F. and with reference to other considerations, as is well understood by those skilled in the art.

The rotating system, member or element, 13, comprises a slender stem or spindle, 14, supported vertically, so as to intersect the axis of each pair of coils at the same relative point, in bearings, 15, and, 16, the former adjustably fastened directly in the top of frame, 1, and the latter at the bottom and supported as will later be described.

Hung from the bottom supporting disk, 9, is a pair of cylindrically bored pole pieces, 17, to which is fastened a permanent magnet, 18. A disk or cap, 19, fastened to the bottom of the pole pieces, supports a cylindrical soft iron core, 20, concentrically within the pole pieces, the core being provided at the bottom with a substantially centrally bored and threaded stem, 21, which is also threaded externally so as to be engaged by a clamp nut, 23, by means of which the core is clamped fast against the disk.

The previously referred to bottom bearing, 16, is at the top of a threaded plug, 22, which is fitted into the central bore of stem, 21. The core, 20, is bored out in line with this central plug.

An inverted and very thin walled aluminum cup, 24, occupies the narrow annular space between core, 20, and pole pieces, 17, and is carried by the spindle, 14, so that, as the spindle rotates, a "drag" or load proportional to the speed of rotation of the spindle will be imposed thereon. This feature is well known in the art and does not form any part of the invention.

The top of spindle, 14, is provided with a worm, 25, meshing with a gear, 26, constituting part of an integrating system, 27, graduated in terms of kilowatt hours and fractions thereof, as is usual in the art.

Mounted upon a disk, 28, similar to the supporting disks, 9, immediately above the top set of coils, 2, is a disk, 29, of hard rubber or equivalent material. Spaced 90° apart and fastened concentrically upon the disk are four pairs of contacts, $2^a$, $3^a$, $4^a$, $5^a$. Each pair of contacts consists of a pair of radially disposed lugs in which are, respectively, an outer inwardly faced contact, 30, and an inner outwardly faced contact, 31. These contacts are, preferably, adjustable radially.

Fastened to the underside of a disk, 32, some little distance above disk, 29, are insulating blocks, 33, one for each pair of contacts, $2^a$, $3^a$, $4^a$, and $5^a$. Fastened to each block is the upper end of a very light steel leaf spring $2^b$, $3^b$, $4^b$, and $5^b$. The leaf springs are supported at equal distances from the center of disk, 32, and so as to be capable of being swung in planes respectively coincident with the planes of the contact pairs $2^a$, $3^a$, $4^a$, and $5^a$. The length and adjustment of the leaf springs is such that their lower ends, which are faced with platinum on each side, will normally rest between the members of each contact pair and against the outer member of each pair.

Fixed concentrically upon the spindle, 14, is a substantially quadrantal segment, 34, of magnetized hardened steel constituting a permanent magnet. The radius of this segment is, preferably, just a trifle less than that of the inner members of each contact pair, $2^a$, $3^a$, $4^a$, and $5^a$.

As the spindle, 14, revolves, carrying with it the segment, 34, the leaf springs, $2^b$, $3^b$, $4^b$, and $5^b$, will be successively acted upon so as to be momentarily pulled away from the outer to the inner member of the contact pairs, falling back once more against the outer member as soon as the segment, 33, has passed.

The magnetic commutating switch, as described, is not only advantageous in that it is frictionless but in that it is, also, substantially non-arcing, it being easily possible to so adjust the leaf springs that their movements in correspondence with the rotation of the magnetic segment, 34, will be substantially instantaneous.

It is obvious that each leaf spring will successively be attracted by the quadrantal segment before the preceding leaf spring is released and permitted to swing outwardly against the inwardly faced contacts, 30. The torques, due to the several pairs of coil sets, will, therefore, overlap somewhat.

In the embodiment of my invention herein described and illustrated, the several dimensions of the magnetic commutating switch have been so chosen that each pair of coil sets exerts its torque through approximately 110° of arc.

The spindle, 14, has fixed thereupon four elongated soft iron members or elements, $2^c$, $3^c$, $4^c$, and $5^c$, of thin sheet, one at the center of each set of coils. Each successively lower placed element is displaced 90°, counter-clockwise, with reference to the element immediately above it.

The rotating system consisting, as it does, of only the spindle proper, 14, the four small and thin soft iron elements, $2^c$, $3^c$, $4^c$, and $5^c$, the quadrantal segment, 34, the worm, 25, and the aluminum cup, 24, is exceedingly light, thus making it possible to have correspondingly small frictional losses in the bearings.

The load coils, 6, of each set of coils, 2, 3, 4, and 5, have their terminals preferably in conducting blocks, 35, 36, fixed adjacent to the coils upon an insulating strip, 37, mounted upon frame, 1, at one side thereof.

Similarly, the E. M. F. or voltage coils, 7, have their terminals in conducting blocks, 38, 39, upon an insulating strip, 40, mounted upon the other side of frame, 1.

The load coils are, preferably, connected up in parallel, corresponding terminals of each going respectively to binding posts, 41, 42.

The E. M. F. coils of the top and third sets, i e., of sets 2, and, 4, have their corresponding terminals joined respectively to conductors 43, 44, which go to opposite leaf springs, $2^b$, and $4^b$. Similarly, the E. M. F. coils of sets, 3, and, 5, are joined respectively to opposite leaf springs, $3^b$, and $5^b$.

All the outer contacts, 30, are connected together and to a terminal binding post, 45; and all the inner contacts, 31, are joined together and to a terminal binding post, 46.

The description just above given will be aided by reference to Fig. 3 where all the operative connections and parts are shown schematically, including the manner of connecting the meter to the circuit whose energy consumption is to be measured.

As shown in this figure the terminal posts, 41, and, 42, are joined to the ends of a load shunt, 47, inserted in one of the main supply wires, 48, 49, between the generator and the load. The magnitude of the load shunt is, of course, determined with relation to the ampere turns of the load and E. M. F. coils as well as with respect to other usual considerations, well understood by those skilled in the art, so as to provide a suitable voltage drop at the terminals of the load coils.

Binding posts, 45, and 46, are respectively joined by conductors 50, 51, one of which includes a resistance, 52, to the two main supply wires, 48, 49.

The entire meter is inclosed in a casing of soft iron comprising a tubular section 53, and top and bottom caps 54 and 55.

The operation of the meter is as follows: Assuming that the main circuit is carrying a load, the four load coils, 6, of sets, 2, 3, 4, and, 5, will all be similarly and continuously energized so as to develop an equal and similarly directed magnetic-flux. Let us suppose this direction to be upwardly and let us call this a positive or a + flux, a downwardly directed flux being, conversely, called a negative or a − flux. For convenience, we will assume that when the upper blocks, 35, and, 38, of the load and E. M. F. coils, respectively, are +, the magnetic flux of such coils will also be + while, if these blocks are −, the magnetic-flux will be correspondingly −.

Considering the E. M. F. coils, 7, it will be noted that the leaf springs, $2^b$, and, $4^b$, to which the terminals of the E. M. F. coils of sets, 2, and, 4, are joined, are both resting against their outer contacts, 30. These voltage coils (i. e., of sets 2 and 4) are thus both short-circuited and developing, of course, no magnetic-flux.

Owing to the fact, however, that the rotating system, 13, has brought the magnetic segment, 34, immediately adjacent to leaf spring, $3^b$, this particular spring will be pulled inwardly against the inner contact, 31, of the contact pair, $3^a$. This will cause the voltage coils of sets, 3, and, 5, to be joined in parallel, but oppositely, between the terminal posts, 45, and, 46, so as to develop an equal but opposite magnetic-flux. The direction of this flux in the voltage coil of set, 3, will be + and in the voltage coil of set, 5, will be −.

The several soft iron elements or members, $2^c$, $3^c$, $4^c$, and $5^c$, are so positioned upon the spindle, 14, that, with the rotating system as shown in Figs. 1 to 3, members, $3^c$, and, $5^c$, will be subjected to maximum torque by any magnetic flux developed in their corresponding load and voltage coils, while members, $2^c$, and, $4^c$, will be subjected to minimum torque.

The torques acting upon members, $3^c$, and, $5^c$, or upon members, $2^c$, and, $4^c$, will, however, be opposite in direction and proportional to the magnitude of the magnetic-flux irrespective of its directions, i. e., without regard to whether this flux is positive or negative.

Considering the load coils only, all of which are developing equal and similarly directed magnetic fluxes, their net effect upon the rotating system will be *nil* since the torque exerted upon members, $3^c$, and $5^c$, will be equal and opposite and, similarly, the torque exerted upon members, $2^c$, and, $4^c$, will be equal and opposite.

Similarly, considering only the E. M. F. coils, the torques exerted upon members, $3^c$, and $5^c$, will be equal and opposite as will also be the torques exerted upon the members, $2^c$, and, $4^c$.

The above condition of stable equilibrium will obviously be true for any and every position of the rotating system if either the effect of the load coils or of the E. M. F. coils, taken alone, be considered.

Let $f^l$ be the flux developed by each load coil and $f^v$ be the flux developed by each voltage or E. M. F. coil. Then, with conditions as shown in Figs. 1 to 3 and above described, the total flux due to the load and E. M. F. coils of set, 3, will be $f^v+f^l$ since both fluxes are +. With respect to the coils of set, 5, however, the total flux will be $f^l-f^v$, since the load fluxes are here opposite, that of the E. M. F. coil being −. The net torque exerted upon the rotating system, therefore, may be expressed as $$T = K'[(f^v + f^1)^2 - (f^v - f^1)^2]$$

or $$T = 4K' f^1 f^v$$

and the rotating system will be turned counter-clockwise.

The magnetic segment, 34, will now be brought adjacent to the leaf spring, $4^b$, which will, in its turn, be drawn inwardly against the inner contact, 31, of contact pair, $4^a$, thus causing the E. M. F. coils of sets, 2, and, 4, to be energized, the former so as to develop a $-$ flux, and the latter a $+$ flux. Similarly, but a little after the leaf spring, $4^b$, has been drawn inwardly, leaf spring, $3^b$, will be released so as to again short-circuit the E. M. F. coils of sets, 3, and, 5, and render these sets torqueless as regards the rotating system.

Coil set, 4, will now develop a $+$ flux, $f^1$, due to its load coil and a $+$ flux, $f^v$, due to its E. M. F. coil while coil set, 2, will develop a $+$ flux $f^1$, due to the load coil and a $-$ flux, $f^v$, due to the E. M. F. coil. The net torque due to coil sets, 2, and, 4, will, hence, be as before, $$T = K'[(f^v + f^1)^2 - (f^v - f^1)^2] = 4K' f^1 f^v$$

and, also as before, its direction will be such as to turn the rotating system counter-clockwise.

Magnetic segment, 34, will now be carried adjacent to leaf spring, $5^b$, so as to draw it against the inner contact, 31, of contact pair $5^a$. This will cause the E. M. F. coils of sets, 3, and, 5, to be again energized but this time reversely as compared with their condition when last energized (i. e., when magnetic segment, 34, was diametrally opposite its now position). The E. M. F. coil of set, 5, will now have a $+$ flux, $f^v$, and the E. M. F. coil of set 3 will have a $-$ flux, $f^v$.

Again the net torque may be expressed as before $$T = K'[(f^v + f^1)^2 - (f^v - f^1)^2]$$

and again the direction of rotation will be counter-clockwise.

Magnetic segment, 34, will now be brought adjacent to leaf spring, $2^b$, so as to draw it against the inner contact, 31, of contact pair, $2^a$. This will cause the E. M. F. coils of sets, 2, and, 4, to be again energized by this time reversely as compared with their condition when last energized (i. e., when magnetic segment, 34, was diametrally opposite its present position). The E. M. F. coil set, 2, will now have a $+$ flux, $f$, and the E. M. F. coil set, 4, will have a $-$ flux, $f^v$.

The net torque will be, as before, $$T = K'[(f^v + f^1)^2 - (f^v - f^1)^2] = 4K' f^1 f^v$$

and the direction of rotation will, as before, be counter-clockwise.

This completes a working cycle, the rotating system having been turned through 360° and the parts thereof being again in the same position with reference to the coil sets and other positions of the meter as obtained at the beginning of the cycle.

The various constants of the several sets of coils should be so determined that the magnitude of the flux due to the E. M. F. coils, this flux value being obviously substantially constant, will always be greater than that due to the load coils even at the maximum load. The direction of the flux due to each and every set or pair of coils (i. e., the E. M. F. coil and its associated load coil) will always be the same as that of its E. M. F. coil.

It will be noted that coil sets, 2, and, 4, conjointly exert maximum torque upon the rotating system each time the system passes through points 180° apart, the torque, due to coils, 3, and, 5, being then zero. Similarly, coil sets, 3, and, 5, exert maximum torque and coil sets, 2, and, 4, zero torque at points 180° apart but midway between points first referred to. The rotating system is thus subjected to maximum torque at each 90° of its rotation, this torque being alternately due first to one pair of coil sets, 2, and, 4, and then to the other pair of coil sets, 3, and, 5.

It will also be noted that the direction of the joint flux developed by each and every coil set will be reversed, i. e., alternately positive and negative, for every 180° rotation of the rotating system.

It will also be clear that the action of coil sets, 2, and 4, is quite independent of the action of coil sets, 3, and, 5, and that, in principle, but one pair of these coil sets is essential; the remaining set being used merely to approximate the condition of a continuously applied torque. Hence, I may, if I desire, employ a greater number of pairs of coil sets, three, e. g., arranging them to act successively at intervals of 60°; or four sets, arranging them to act successively at intervals of 45°. The soft iron elements, $2^c$, $3^c$, etc., would, of course, have to be increased in correspondence with the increased number of pairs of coil sets and their angles or relative displacement correspondingly altered. The number of contact pairs, $2^a$, $3^a$, etc., and their angles of relative displacement would, of course, also require to be suitably changed.

Any increase in the number of pairs of coil sets employed, however, will increase the size of the meter, the cost of manufacture, and in general, will make the meter more complex.

It will also entail an added weight for the rotating system and hence increase the frictional loss.

Owing to the reversal in direction of the magnetic flux due to each coil set for each 180° rotation of the rotating system, it follows that the several soft iron elements $2^c$, $3^c$, etc., are correspondingly alternately reversed in magnetism, i. e., are passed through the hysteretic loop. The meter, therefore, is free from hysteresis errors.

The casing, 53, 54, and, 55, is exceedingly simple and cheap to make, ordinary soft iron pipe being suitable therefor; it will effectually protect the operative parts of the meter from stray magnetic fields and, hence, against errors consequent thereupon.

I have illustrated and described a preferred form of my invention. However, many details may be changed within the spirit thereof and within the scope of the claims which will hereafter follow.

Thus, it is not essential that the coil sets and the soft iron elements $2^c$, $3^c$, etc., should be inclined at 45° as shown. They need not, indeed, be inclined at all, provided merely that they be relatively arranged so that the coil sets are able to exert torque upon the rotating system by their paired action upon the several soft iron elements, hence the planes of the coil sets may be vertical or horizontal or inclined at any desired angle thereto, the soft iron elements being suitably disposed in correspondence therewith.

Similarly, the magnetic commutating switch, while possessing many advantages and being, according to my present view, a preferred arrangement, is not essential, and other commutating devices may be employed within the spirit of the invention and without any substantial change with respect to other features of construction which have been mentioned.

Having described my invention, I claim:

1. In an electric meter of the class described, a rotatable system having a soft iron element fixed thereto, two identical pairs of stationary coils similarly disposed as to the axis of rotation of the aforesaid system and adapted to exert opposite torques upon the iron element, each pair having an E. M. F. coil and a load coil, the load coils being adapted to carry certain currents such that the current flow is proportional to the load and the E. M. F. coils being adapted to carry certain currents such that the current flow is proportional to the E. M. F., the current flow in one pair of coils being in the same direction and in the other pair of coils being in opposite directions, and means for simultaneously reversing the E. M. F. coils in synchronism with the rotation of the soft iron element.

2. In an electric meter of the class described, a rotatable system having a soft iron element fixed thereto, two identical pairs of stationary coils similarly disposed as to the axis of rotation of the aforesaid system and adapted to exert opposite torques upon the iron element, each pair having an E. M. F. coil and a load coil, the load coils being adapted to carry certain currents such that the current flow is proportional to the load and the E. M. F. coils being adapted to carry certain currents such that the current flow is proportional to the E. M. F., the current flow in one pair of coils being in the same direction and in the other pair of coils being in opposite directions, and a commutator controlled by the rotation of the rotatable system for simultaneously reversing the E. M. F. coils in synchronism therewith.

3. In an electric meter of the class described, a rotatable system having a soft iron element fixed thereto, two identical pairs of stationary coils similarly disposed as to the axis of rotation of the aforesaid system and adapted to exert opposite torques upon the iron element, each pair having an E. M. F. coil and a load coil, the load coils being adapted to carry certain currents such that the current flow is proportional to the load and the E. M. F. coils carrying current proportional to the E. M. F., the current flow in one pair of coils being in the same direction and in the other pair of coils being in opposite directions and a commutator comprising a permanent magnet fixed to said system and stationary springs of magnetic material disposed adjacent thereto and connected with the E. M. F. coils, said springs being adapted to be successively attracted as the magnet moves past them so as to simultaneously reverse the E. M. F. coils.

In testimony whereof I have hereunto set my hand.

THOMAS W. VARLEY.